June 11, 1968  A. J. CARINO  3,387,813
HOLD-DOWN DEVICE
Filed July 20, 1966  2 Sheets-Sheet 1
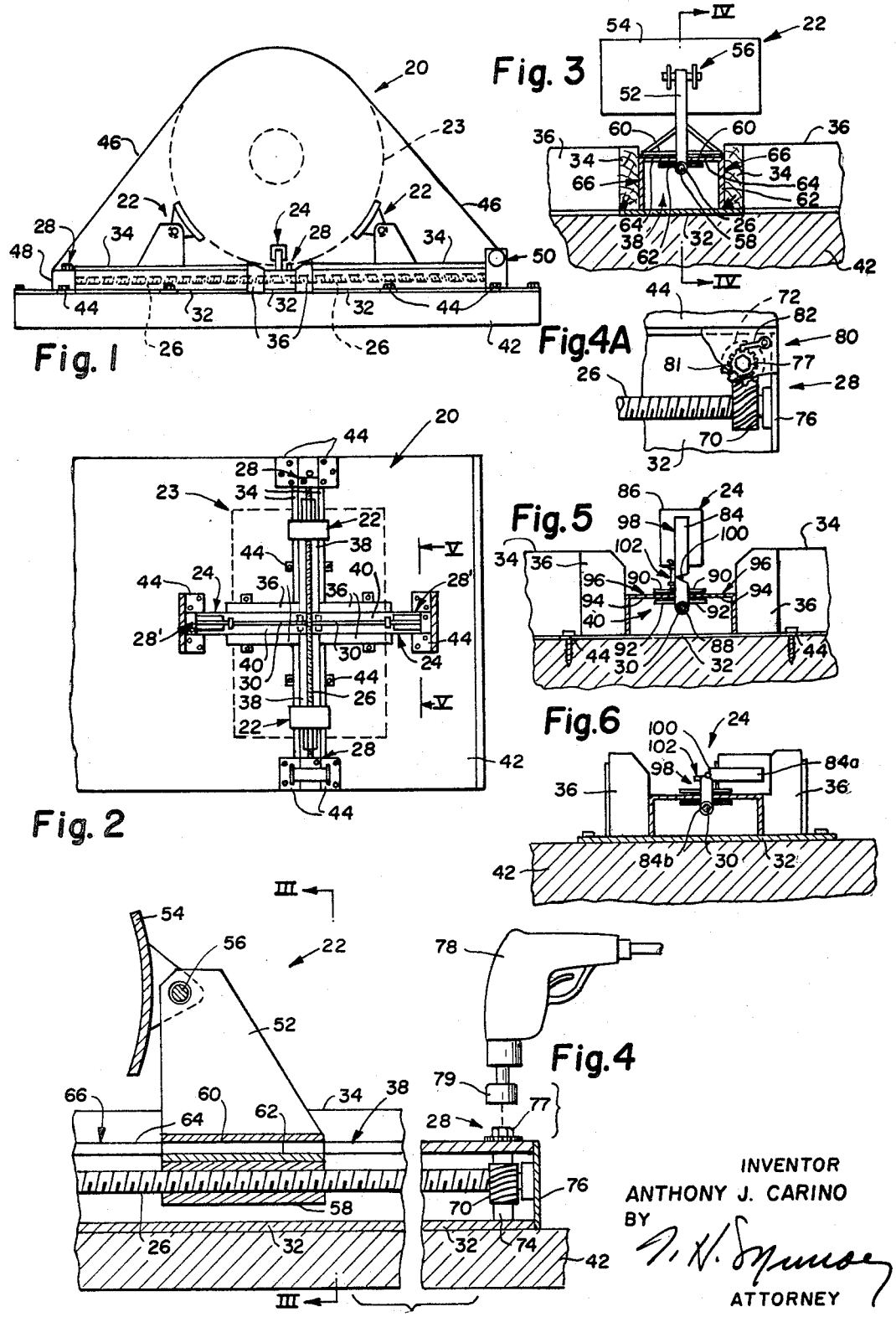
INVENTOR
ANTHONY J. CARINO
BY
ATTORNEY June 11, 1968  A. J. CARINO  3,387,813
HOLD-DOWN DEVICE
Filed July 20, 1966  2 Sheets-Sheet 2
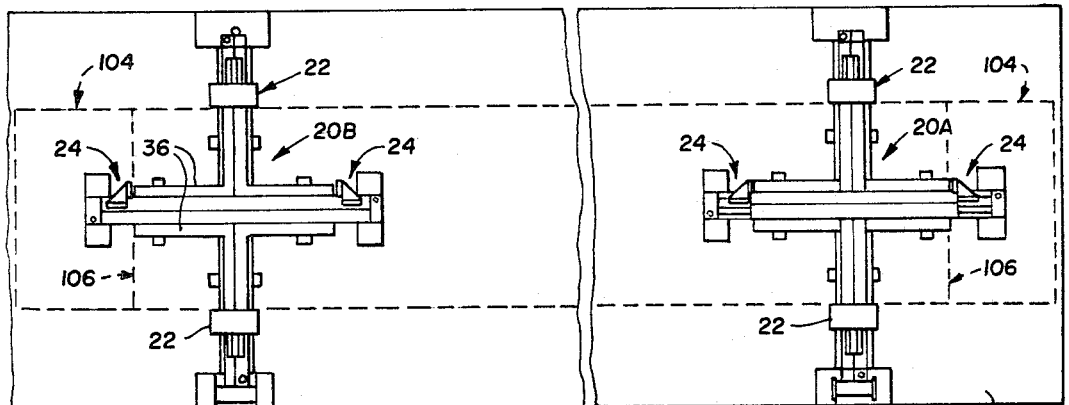
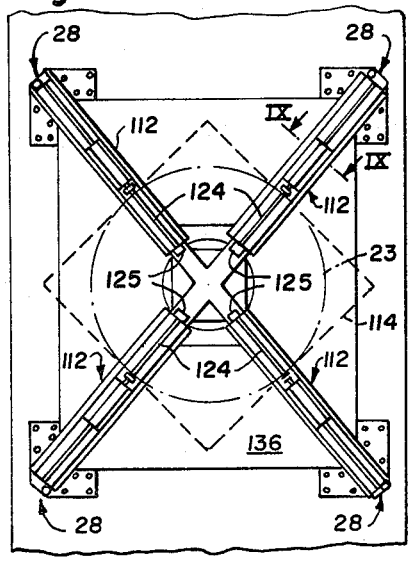
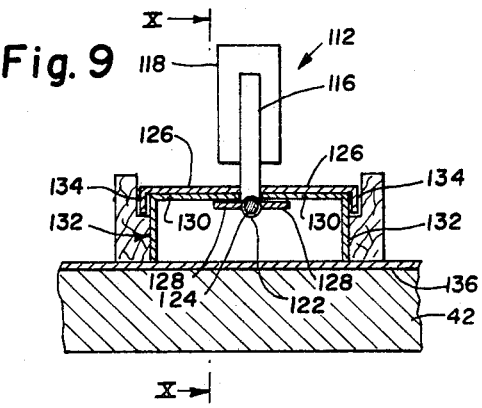
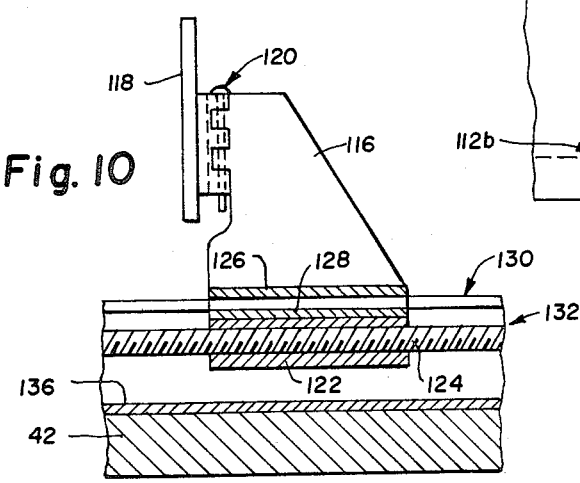
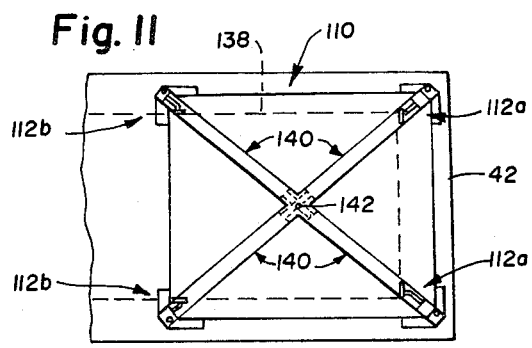
INVENTOR
ANTHONY J. CARINO
BY
ATTORNEY

United States Patent Office 3,387,813
Patented June 11, 1968

3,387,813
HOLD-DOWN DEVICE
Anthony J. Carino, Box 277N, R.D. 1,
Leechburg, Pa. 15656
Filed July 20, 1966, Ser. No. 566,565
5 Claims. (Cl. 248—361)

ABSTRACT OF THE DISCLOSURE

Coils of sheet steel or the like are held to the bed of a vehicle by means of a device having clamping members moved simultaneously toward and away from the cargo, using right- and left-hand screw means operated through an intermediate drive means, to permit ready accessibility and make possible convenient use of an extrinsic tool, such as a pneumatic torque applying device. In a preferred embodiment, there is also provided a second clamping means, similarly having right- and left-hand screw drive means operated through an intermediate drive means, but running transversely of the first clamping means. Pivoted pads for engaging the cargo and strap means for holding down cargo engaged by the clamping means are also shown.

---

This invention relates to hold-down devices of the type adapted to be mounted on the bed of a vehicle, such as, a trailer or a rail car, and more particularly to hold-down devices for rigidly holding cargo, such as steel coils or the like, to the bed of a vehicle during transportation.

Although not limited thereto, the hold-down device of the present invention is particularly adapted for holding steel coils, that is, coils of sheet steel, rigidly in place on a vehicle during their transportation.

One object of the present invention is to provide an improved hold-down device incorporating opposed clamping members which may be driven simultaneously toward and simultaneously away from each other by means of an extrinsic tool, such as a pneumatic torque applying device.

In accordance with the present invention, a hold-down device is provided for cargo such as steel coils or the like. The hold-down device may be permanently or temporarily mounted on the bed of a vehicle, as desired, and may be used individually or in multiples for rigidly holding cargo to the bed of the vehicle.

The hold-down device of the present invention comprises blocking rails preferably secured to the bed of a vehicle and positioned to support the cargo. Clamping members are provided, one on each side of the blocking rails. Guide means extending transversely of the blocking rails guide the clamping members during movement thereof toward and away from the blocking rails. Screw means, preferably in the form of a single screw having right and left-hand threads formed on its opposite ends, is positioned below and threadedly engaged with the clamping members. An intermediate driving member is connected in torque transmitting relation with the screw means whereby the screw means may be driven by an extrinsic drive means such as a pneumatic torque transmitting device. The overall arrangement is such that rotation of the screw means in one direction causes the clamping members to move simultaneously toward each other for clamping cargo therebetween, whereas rotation of the screw means in the opposite direction causes simultaneous movement of the clamping members away from each other for releasing the cargo.

The hold-down device of the present invention additionally includes second clamping members, one positioned on each side of the path of travel of the first-mentioned clamping members. Second guide means extend parallel with the blocking rails and guide the second clamping members during movement thereof parallel to the blocking rails and toward and away from the cargo. Second screw means, preferably in the form of a single rod for each of the second clamping members, is positioned below and threadedly engaged with the second clamping members. Such intermediate driving member is connected in torque transmitting relation with the second screw means whereby the second screw means may be rotated by the aforesaid extrinsic drive means independently of the first screw means. Again, the overall arrangement is such that rotation of the second screw means in one direction causes the second clamping members to move toward the cargo, whereas rotation of the second screw means in the opposite direction causes the second clamping members to move away from the cargo.

The above and other objects and advantages of the present invention will become apparent from the following detailed description by reference to the accompanying drawings, in which:

FIGURE 1 is an end view of the present hold-down device shown supporting a steel coil;

FIG. 2 is a plan view of the present hold-down device further illustrating the relative positions of the various components;

FIG. 3 is a cross-sectional view, taken along the line III—III of FIG. 4, illustrating one of a pair of first clamping members;

FIG. 4 is a cross-sectional view, taken along the line IV—IV of FIG. 3, further illustrating a first clamping member;

FIG. 4A is a fragmentary plan view, partly in cross-section, illustrating an intermediate drive means;

FIG. 5 is a cross-sectional view, taken along the line V—V of FIG. 2, illustrating one of a pair of second clamping members;

FIG. 6 is a view, similar to FIG. 5, illustrating a second clamping member disposed in a horizontal position;

FIG. 7 is a plan view of a trailer bed incorporating a plurality of the present hold-down devices;

FIG. 8 is a plan view, similar to FIG. 2, illustrating an alternative embodiment of the present hold-down device;

FIG. 9 is a cross-sectional view taken along the line IX—IX of FIG. 8, illustrating a clamping member;

FIG. 10 is a fragmentary side view, as viewed from the line X—X of FIG. 9, further illustrating the clamping member employed in the embodiment of FIG. 8; and FIG. 11 is a plan view of a vehicle bed schematically illustrating the use of a plurality of the hold-down devices illustrated in FIG. 8.

Referring now to FIGS. 1 and 2, there is illustrated a hold-down device 20 of the present invention, comprising, in general, a pair of opposed first clamping members 22 shown engaging the opposite sides of a steel coil represented herein by the dotted outline 23 in FIG. 1, and a pair of opposed second clamping members 24 positioned to engage the ends of the steel coil 23. As can best be seen in FIG. 2, screw means 26 is threadedly engaged with the first clamping members 22 and, through the driving action of intermediate driving means 28, serves to move the first clamping members 22 simultaneously toward each other to effect blocking or clamping of the steel coil 23 and simultaneously away from each other for releasing the steel coil 23. The second clamping members 24 each have screw means 30 which, through the driving action of a second intermediate driving means 28', serve to move the second clamping members independently toward the steel coil 23 for clamping the same, and independently away from the steel coil 23 for releasing the same. As will be described the first and second intermediate driving means 28 and 28' are identical in construction.

Referring again to FIGS. 1 and 2, a plate 32 having perpendicular arms, is secured to the bed 42. First blocking rails 34, secured to the plate 32, are provided on opposite sides of the screw means 26 while second blocking rails 36, also secured to the plate 32, are provided on opposite sides of each of the screw means 30. Disposed between the first and second blocking rails 34, 36 are guide means 38, 40 serving to support and guide the first clamping members 22 and the second clamping members 24, respectively.

The aforesaid elements are united together into a unitary structure which is temporarily or permanently secured to a bed 42 of a truck trailer or rail car. Securement of the structure is achieved by fasteners passing through flanges 44 of the plate 32, into the bed 42.

As best shown in FIG. 1, the hold-down device 20 additionally includes strap means 46, in the form of a chain or cable, having one end secured to a ring 48 and its opposite end operatively connected to a winch 50. The ring 48 and the winch 50 are supported on the hold-down device 20 and form a part thereof. The strap means 46 passes over the steel coil 23, for example, and serves to further rigidly secure the steel coil 23 to the bed 42.

Referring now to FIGS. 3 and 4, the first clamping members each comprise an arm 52 which projects above the blocking rails 34 and has a pad 54 pivotally connected to the upper end of the arm 52 by a pivotal connection 56 having an axis extending transversely of the blocking rails 34. Accordingly, the pad 54 may be pivoted into surface engagement, for example, with the steel coil 23 as shown in FIG. 1. Secured to the lower end of the arm 52 is a tubular member 58 having internal threads matching the threads provided on the screw means 26. The arrangement is such that rotation of the screw means 26 in one direction causes the first clamping member to move to the left of FIG. 4 while rotation of the screw means 26 in the opposite direction causes movement of the clamping member 22 to the right of FIG. 4.

Evtending horizontally from both sides of the lower end of the arm 52 are upper and lower flanges 60, 62 which are disposed above and below horizontal legs 64 of angle members 66. The angle members 66 extend for the entire length of movement of the first clamping members 22 and are secured to the plate 32 in the position shown. The upper and lower flanges 60, 62 and the horizontal legs 64 of the angle members 66 comprise the aforementioned guide means 38 which, as stated, support and guide each of the first clamping members 22 during their movement toward and away from each other.

It is to be noted at this time that FIG. 4 illustrates but one of the first clamping members 22. The other of the first clamping members 22 has an identical construction with the exception that the tubular member 58 and that portion of the screw means 26 with which the tubular member 58 is engaged has threads of opposite hand.

The intermediate driving means 28, as best shown in FIGS. 4 and 4A may comprise intermeshing helical gears 70, 72. The helical gear 70 is keyed to the screw means 26 while the helical gear 72 is keyed to a vertical stub shaft 74 suitably journaled in a casing 76 and the plate 32. The vertical stub shaft 74 has a hex-head upper end 77 which is positioned exteriorly of the casing 76. The hex-head upper end 77 is adapted to be turned by a conventional pneumatically operated, torque applying tool shown at 78. The tool 78 may comprise the type employed to tighten the nuts of an automobile wheel. The tool 78 includes a socket 79 which is fitted over the hex-head upper end 77 to connect the intermediate driving means 28 to the tool 78.

As can best be seen in FIG. 4A, the intermediate driving means 28 includes a snap lock 80 for locking the helical gears 70, 72 after a cargo has been clamped between the clamping members 22, for example. The snap lock 80 may comprise a washer 81 secured to the stub shaft 74 and having a serrated edge and a pawl 82 which is biased, that is spring loaded, in the direction of engagement with washer 81. Other suitable snap lock arrangements may be employed.

Although at least one of the intermediate drive means 28 is required at one end of the screw means 26, it is preferred that a second one of the intermediate drive means 28 be provided at the opposite end of the screw means 26 for the convenience of the workers.

Referring now to FIG. 5, the second clamping members 24 are constructed in a manner similar to the construction of the first clamping members 22 with a few minor exceptions. As shown in FIG. 5, the second clamping member 22 comprises an arm 84 having a pad 86 rigidly connected thereto. An internally threaded tubular member 88 is secured to the lower end of the arm 84 and is threadedly engaged with one of the second screw means 30. Secured to and projecting from either side of the arm 84 are upper and lower flanges 90, 92 having disposed therebetween horizontal legs 94 of angle members 96. The angle members are secured to the plate 32 in the position shown. As in the case of the first clamping members 22, the upper and lower flanges 90 and 92 and the horizontal arms 94 of the angle members 96 comprise the second guide means 40 and serve to support and guide the second clamping members during movement thereof toward and away from each other.

The second intermediate driving means 28' is not specifically illustrated herein inasmuch as its construction is identical to the construction of the above-described first intermediate drive means 28 (FIGS. 4 and 4A). Operation of the second intermediate driving means 28' is identical to the operation of the first intermediate driving means 28. One of the second intermediate driving means 28' is provided at the end of each of the second screw means 30. The second screw means 30 moves the second clamping members 24 independently toward each other and independently away from each other in accordance with the direction of rotation of the second intermediate driving means 28'.

Referring now to FIGS. 2 and 6, the second clamping members 24 are preferably provided with releasable hinge means 98 which are shown in FIG. 6, to comprise, for example, a suitable hinge connection 100 hingedly connecting upper and lower arm portions 84a, 84b and a locking device 102 serving to lock the upper and lower arm portions 84a, 84b in the upright position shown in FIG. 5. In FIG. 6, the hinge means 98 has been released and the upper arm portion 84a is shown pivoted into a substantially horizontal position. The upper arm portion 84a may be disposed in this horizontal position only when the second clamping members 24 are disposed beyond the ends of the second blocking rails 36.

Lowering of the upper arm portions 84a of the second clamping members 24 is particularly useful when a plurality of the hold-down devices 20 are used in conjunction to clamp an elongated cargo to the bed 42. As schematically illustrated in FIG. 7, for example, two of the present hold-down devices 20A and 20B are secured to the bed 42. An elongated cargo, represented by the dotted outline 104, is shown extending between and beyond the hold-down devices 20A and 20B. In this instance, the second clamping members 24 have been pivoted into the horizontal position whereby the elongated cargo 104 may rest on the second blocking members 36 and pass over the second clamping members 24.

On the other hand, should the elongated cargo terminate in the region of the second clamping members 24 as shown by the lines 106, the end ones of the second clamping members 24 may be placed in their normal upright position and employed to engage the ends 106 thereby clamping the elongated cargo therebetween. In either of the above-described instances, the first clamping members 22 would, of course, engage the sides of the elongated cargo and prevent its movement laterally of the bed 42.

An alternative embodiment of the present hold-down device is illustrated in FIGS. 8–11, inclusive, and designated generally by the numeral 110. Corresponding numerals will be employed to identify corresponding parts heretofore described.

In this embodiment and as best shown in FIGS. 8 and 9, a plurality of clamping members 112 are employed and disposed in opposed relationship whereby each opposed pair of the clamping members 112 will engage diametrically opposed surfaces of a cargo such as the steel coil 23 or the rectangular cargo indicated by the dotted outline 114.

Each of the clamping members 112 is arranged to be supported, guided and driven in an identical manner and independently of one another. Accordingly, as shown in FIGS. 8, 9 and 10, each of the clamping members 112 comprises an arm 116 having a pad 118 pivotally connected for rotation about a vertical axis by means of a vertical pivot connection 120 (FIG. 10). An internally threaded tubular member 122 is secured to the lower end of the arm 116 and is threadedly engaged with screw means 124 whose ends are supported in journals 125 (FIG. 8) on the device 110. Disposed at the lower end of the arm 116 and projecting from either side thereof, are upper and lower flanges 126, 128 having horizontal legs 130 of angle members 132 disposed therebetween. The upper flanges 126 terminate at their outer edges in downturned legs 134 which serve to stabilize the clamping members 112. The angle members 132 are secured to a plate 136 which overlies the bed 42 and is secured thereto preferably in the manner shown in FIG. 8.

Referring again to FIG. 8, each of the clamping members 112 is moved by means of a separate one of the screw means 124. Consequently, each of the screw means 124 has operatively connected thereto one of the above-described intermediate driving means 28. Accordingly, the tool 78 shown in FIG. 4, may be again employed to forcibly move each of the clamping members 112 into engagement with a surface of the cargo being clamped. Although the pad 118 has been shown with a flat configuration, it should be readily apparent that pads having other configurations may be quickly and easily connected to the arm 116. Configurations of the other pads would include an angle-shape particularly adapted to engage a corner of a cargo, a pad having a rounded surface adapted to engage the round surface of, for example, the steel coil 23, as well as any other configuration desired.

As in the case of the hold-down device 20, the hold-down device 110 may also be employed in multiples to clamp elongated cargos. As schematically shown in FIG. 11, an elongated cargo designated by the dotted outline 138 is shown extending from one of the present hold-down devices 110 to a second hold-down device, not shown herein. In this instance, clamping members 112a are shown forcefully engaged with the end of the elongated cargo 138 whereas the remaining clamping members 112b are shown forcefully engaged with the sides of the elongated cargo 138. Orientation of the clamping members 112a and 112b is, of course, facilitated by the pivotal connection 120 shown in FIG. 10.

If desired, the hold-down device 110 may be provided with strap means similar to the strap means 46 (FIG. 1) for further securing the cargo to the bed 42.

As schematically illustrated in FIG. 11 and as an alternative to the arrangement shown in FIG. 8, each of the clamping members 112a and 112b may be supported on separate arm structures 140 whose inner ends are connected by a center pin 142. The arrangement is such that the arm structures 140 are pivotal about the center pin 142 to accommodate the hold-down device 110 to beds which are wider or narrower than the bed 42.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A hold-down device for cargo such as steel coils or the like, said device being mounted on the bed of a vehicle and comprising: blocking rails secured to the bed of said vehicle and positioned to support said cargo; clamping members, one positioned on each side of said blocking rails; means extending transversely of said blocking rails for guiding said clamping members during movement thereof toward and away from said blocking rails; and screw means positioned below and threadedly engaged with each of said clamping members for moving the same toward said blocking rails to clamp said cargo and away from said blocking rails to release said cargo, said device further including an intermediate driving member connected in torque transmitting relation with said screw means for rotating said screw means, said intermediate driving member being rotated by an extrinsic pneumatically operated, torque applying tool.

2. The hold-down device as defined in claim 1 wherein said intermediate driving member comprises a first gear secured to said screw means, a stub shaft journaled for rotation about an axis extending perpendicular to said screw means, a second gear secured to said stub shaft and meshing with said first gear; and said stub shaft having an exposed end adapted for connection in torque transmitting relation with said tool.

3. A hold-down device for cargo such as steel coils or the like, said device being mounted on the bed of a vehicle and comprising: blocking rails secured to the bed of said vehicle and positioned to support said cargo; clamping members, one positioned on each side of said blocking rails; means extending transversely of said blocking rails for guiding said clamping members during movement thereof toward and away from said blocking rails; and screw means positioned below and threadedly engaged with each of said clamping members for moving the same toward said blocking rails to clamp said cargo and away from said blocking rails to release said cargo, said device further including second clamping members, one positioned on each side of the said first-mentioned clamping members; means extending parallel with said blocking rails for guiding said second clamping members during movement thereof parallel to said blocking rails; individual second screw means positioned below and threadedly engaged with each of said second clamping members for moving each of said second clamping members toward and away from said cargo independently of each other; and a second intermediate driving member connected in torque transmitting relation with said second screw means for rotating said second screw means, said second intermediate driving member being rotated by an extrinsic drive means independently of the first-mentioned intermediate driving member.

4. The hold-down device as defined in claim 3 wherein each of said clamping members comprises an arm having a lower arm portion engaged with said guide means and an upper arm portion projecting above said blocking rails, a pad secured to said upper arm portion in position to engage a surface of said cargo; and releasable hinge means having a pivotal axis substantially parallel with said second screw means for pivotally supporting said arm portion for movement between an upright position wherein said pad is adapted to engage said surface of said cargo to a substantially horizontal position spaced below the upper surface of said blocking rails.

5. A method of transporting a heavy object of generally cylindrical outline, said method comprising
placing said object within a hold-down device mounted on the bed of a vehicle, said device comprising blocking rails secured to the bed of said vehicle positioned to support said object; clamping members, one positioned on each side of said blocking rails; means extending transversely of said blocking rails for guiding said clamping members during movement thereof toward and away from said blocking rails; and screw means positioned below and threadedly engaged with each of said clamping members for moving the same toward said blocking rails to clamp said cargo and away from said blocking rails to release said cargo, said device further comprising an intermediate driving member connected in torque transmitting relation with said screw means for rotating said screw means, said intermediate driving member being rotated by an extrinsic pneumatically operated, torque applying tool,
operating said intermediate driving member to move said clamping members toward said object,
transporting said object by means of said vehicle, and again operating said intermediate driving member to move said clamping members away from said object to release the same.

References Cited

UNITED STATES PATENTS

| | | | |
|---|---|---|---|
| 534,386 | 2/1895 | Bettmann | 280—144 |
| 2,295,609 | 9/1942 | Shimon | 248—119 X |
| 2,388,304 | 11/1945 | Ackerman | 105—369 X |
| 2,622,918 | 12/1952 | Staffe | 105—369 X |
| 2,817,304 | 12/1957 | Newcomer | 105—367 |
| 2,851,235 | 9/1958 | Henig | 248—119 |
| 2,053,969 | 10/1936 | Olds | 296—35.1 X |

FOREIGN PATENTS

| | | |
|---|---|---|
| 390,794 | 4/1965 | Switzerland. |

CHANCELLOR E. HARRIS, *Primary Examiner.*